United States Patent [19]

Prosol

[11] 4,141,172
[45] Feb. 27, 1979

[54] AUTOMATIC CRUSTACEAN TRAP

[76] Inventor: Mikhail I. Prosol, 2546 Cedar Ave., Long Beach, Calif. 90806

[21] Appl. No.: 793,071

[22] Filed: May 2, 1977

[51] Int. Cl.² .............................................. A01K 69/10
[52] U.S. Cl. ..................................................... 43/105
[58] Field of Search ............................ 43/105, 100, 67

[56] References Cited

U.S. PATENT DOCUMENTS

| | | | |
|---|---|---|---|
| 132,476 | 10/1872 | Livaudais | 43/105 |
| 1,036,574 | 8/1912 | Crane | 43/105 |
| 1,463,062 | 7/1923 | Roberts | 43/105 |
| 3,903,637 | 9/1975 | Dorsey | 43/105 |

FOREIGN PATENT DOCUMENTS 757013  10/1933  France ....................................... 43/105

*Primary Examiner*—Harold D. Whitehead
*Assistant Examiner*—Roscoe V. Parker
*Attorney, Agent, or Firm*—I. Michael Bak-Boychuk

[57] ABSTRACT

A baited lobster trap including a rigid, planar, wire base supporting a vertically disposed tubular mount having disposed on the interior thereof a pivotally supported latch. Connected to the latch and extending to the exterior of the mount is a bait dispenser disposed to be articulated by the crustacean entering the trap for concurrent pivotal articulation of the latch. Two peripheral frame members conforming to the halves of the peripheral edge of the base are hinged in diametric alignment on the base, the free edges thereof being engaged to corresponding connecting members which at the other end attach to a collar disposed around a tubular guide telescopically attached to extend out of the free end of the mount. Disposed on the interior of the guide is a latching rod including a lip on the lower end thereof engageable by said latch, the rod engaging the collar through two longitudinal slots formed in the guide. To provide the necessary trapping forces each frame member is spring biased to pivot away from the base deploying a flexible mesh screen connected therebetween upon the release of the latch. Concurrently the connecting members advance the collar and the rod outwardly along the guide to articulate a float indicating a closure.

3 Claims, 8 Drawing Figures

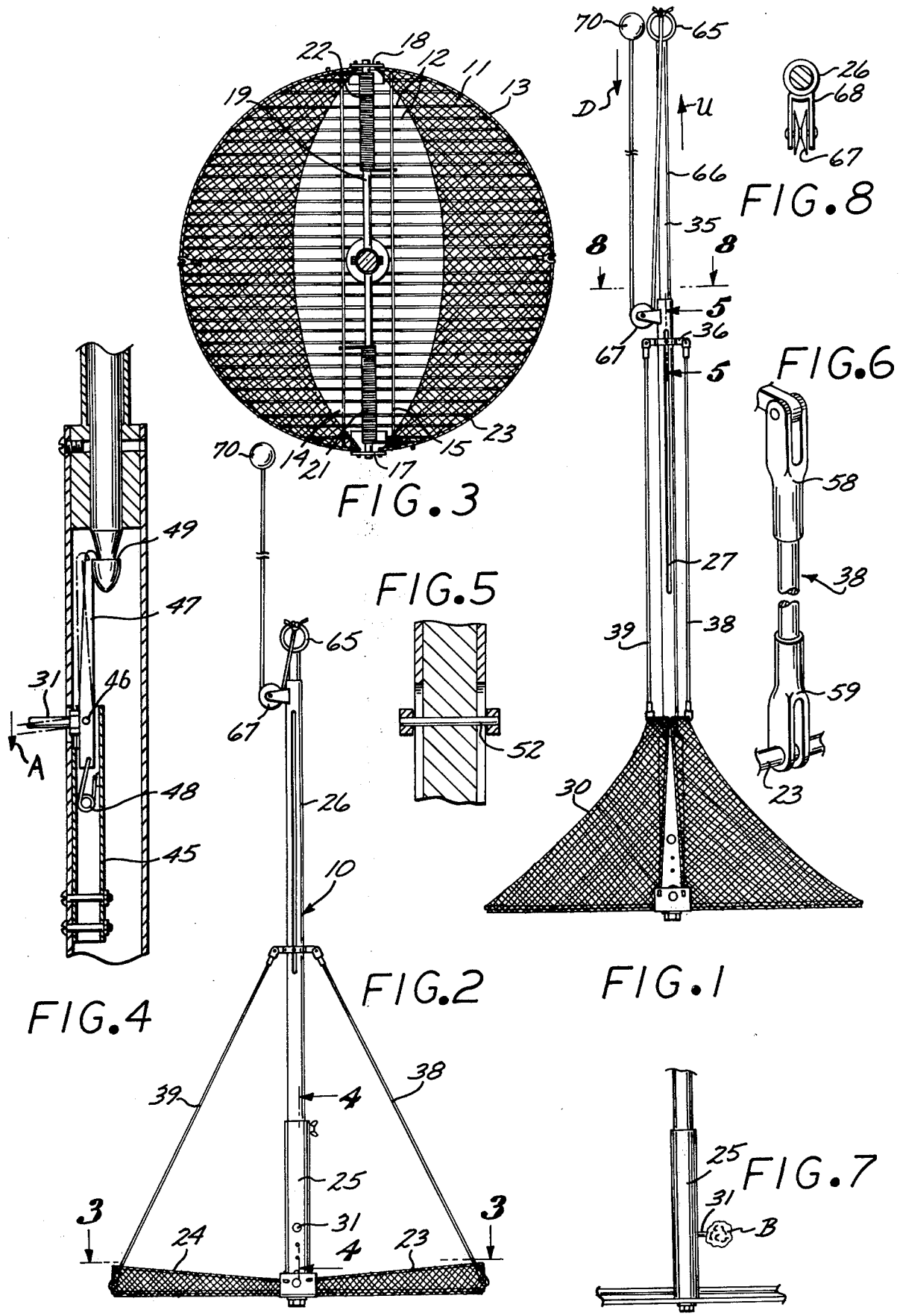

AUTOMATIC CRUSTACEAN TRAP

BACKGROUND OF THE INVENTION

1. Field of the Invention

The present invention relates to trapping devices and more particularly to baited lobster traps.

2. Description of the Prior Art

The trapping of lobsters or other crustaceans has been an activity extensively practiced in the past. Most often passive traps have been utilized for this purpose which by virtue of their architecture would render egress more cumbersome than ingress, the passive character thereof, however, being most practical for commercial or large number applications. The use of baited automatic traps for this purpose has normally had little acceptance, particularly because of the lack of discrimination available in the prior art devices. Typically the bait found attractive by crustaceans is also attractive to fish and most such prior art traps would respond indiscriminately to the more frequent bait engagements therewith. Thus the monitoring of the prior art active or articulating traps would often entail very low production levels, returning either empty or trapping the less valuable fish species.

SUMMARY OF THE INVENTION

Accordingly it is the general purpose and object of the present invention to provide a trap which is released by the feeding motion characteristics of crustaceans.

Other objects of the invention are to utilize to best advantage the distinct mode of feeding of a crustacean in order to release a trap.

Further objects of the invention are to provide a spring-biased lobster trap which on release will articulate a float.

Yet further objects of the invention are to provide a crustacean trap which is convenient in use, simple in manufacture and requires little maintenance.

Briefly these and other objects are accomplished within the present invention by providing a planar wire base formed substantially as a disc or circular surface to the center of which a vertically disposed tubular mount is attached.

Disposed on the interior of the mount and supported for pivotal articulation about a transverse axis therein is a latch including a latching detent on the upper end or the end distal of the base. A bait dispenser extends through the lateral surface of the mount, this bait dispenser being rigidly attached to the latch for articulation thereof whenever the bait is taken.

In the configuration set out the direction of the latching detent is towards the interior of the mount and only downward tugging on the bait will effect withdrawal. In this manner the normal mode of sea bottom travel of a lobster or other crustacean is being used to best advantage since in the course of feeding on the bait such species will produce the necessary downward tugs. Most of the other species in the sea will be feeding from above, thus being conveniently discriminated by the structure herein.

Received in the upper or free end of the mount and secured thereto is a reduced diameter tubular guide having longitudinal, diametrically opposed slots formed in the exposed lateral surfaces thereof. Received in telescopic translation on the interior of the guide, and extending beyond the ends thereof, is a latching rod including a latch engaging lip formed on the lower end for engaging said latch within the interior of the mount and a rope attachment on the upper end secured to a rope deploying a float. To produce the desired downward articulation of the float upon an upward articulation of the rod there is further provided a pulley on the side of the guide around which the rope is turned.

The trap itself includes two substantially semi circular frame members, approximating the plan form of the base, each frame member being pivotally engaged at its free ends to the base, and each frame member further connecting to flexible mesh which is also secured to the base. Each frame member is furthermore spring-biased to pivot away from the base to thus deploy the mesh around the mount and the bait dispenser. The frame members, in addition, are joined by way of corresponding connecting members to a collar surrounding the guide and engaging the rod through the slots therein.

Thus, when the bait is tugged downwardly by a lobster standing on the base the latch is released allowing the frame members to close and the rod to advance upwardly, this closure then foreshortens the rope producing the desired articulation of the float.

BRIEF DESCRIPTION OF THE DRAWINGS

FIG. 1 is a side view of a trap constructed according to the present invention, articulated to a closed position;

FIG. 2 is a side view of the trap shown in FIG. 1 articulated to an open position;

FIG. 3 is a top view of the trap shown in FIG. 1;

FIG. 4 is a sectional view taken along the line 4—4 of FIG. 2;

FIG. 5 is a detail view in section taken along line 5—5 of FIG. 1;

FIG. 6 is a detailed perspective view of one connecting member useful with the trap herein;

FIG. 7 is a side view in detail of the bait dispensing arrangement useful herein; and FIG. 8 is a top view, in section, taken along the line 8—8 of FIG. 1.

DESCRIPTION OF THE SPECIFIC EMBODIMENT

As shown in FIGS. 1, 2 and 3, the inventive lobster trap, generally designated by the numeral 10, comprises a circular base 11 formed out of wire segments 12 welded or attached to a peripheral frame 13. Extending diametrically across frame 13 and in rectangular alignment with segments 12 are two substantially parallel stiffeners 14 and 15 disposed on either side of two diametrically opposed brackets 17 and 18. Brackets 17 and 18 are attached to the peripheral frame 13 to provide the end supports for a cross bar 19. Wound around the end segments of cross bar 19 are first and second coil springs 21 and 22, spring 21 being engaged between stiffener 14 and a semicircular frame member 23 pivotally engaged at the ends thereof in brackets 17 and 18. In similar arrangement spring 22 is engaged between stiffener 15 and yet another frame member 24 pivoted between the brackets 17 and 18.

Frame members 23 and 24 are thus pivotally moveable between a position adjacent the peripheral frame 13 and a vertical plane, in the manner of a clam shell closure, the bias of the springs being in the direction of claim shell closure. A flexible mesh 30 connected between the peripheral edge 13 and the frame members 23 and 24 is thus deployed to provide a closure.

Disposed centrally on base 11 and extending normally therefrom is a tubular mount 25 receiving in the free end thereof the end of a tubular guide 26 extending uwpardly from the base. Guide 26 includes two longitudinal diametrically opposed slots 27 formed in the exposed lateral surface thereof. A latching rod 35 is received on the interior of guide 26, being dimensioned for sliding translation therein to concurrently articulate a collar 36 disposed around the guide 26 and joined to the rod 35 through slots 27. Connected between collar 36 and the central segments of frame members 23 and 24 are two corresponding rods 38 and 39 by which the rod 35 is advanced on a closing rotation of the frame members.

As shown in FIG. 4 mount 25 includes on the interior a tubular pivot support 45 engaging a transverse pivot pin 46 about which a latch 47 is pivoted. Received further in support 45 is a latching spring 48 urging the latching end of latch 47 towards the interior of the mount 25. In this bias the latch 47 is directed towards the lower end of rod 35 to engage a lip 49 formed therein. Extending from latch 37 to the exterior of mount 25 is a bait support or dispensing element 51 on which bait B, shown in FIG. 7, is deployed. When the bait B is tugged in the downward direction shown by arrow A the latch is released, releasing concurrently the rod 35 which through a pin 52, shown in FIG. 5, releases the collar. The frame members 23 and 24 are then free to close, surrounding the trapped specimen with mesh 39.

As shown in FIG. 6 the interconnection between frame member 23 and collar 36, for example, is made by the connecting element 38, element 38 terminating on either end in a pivotal connection formed by way of a first and second turnbuckle 58 and 59 through which the necessary dimensioned adjustment can be made to deploy lip 49 in a latching alignment.

As shown further in FIGS. 1, 2 and 8, the upper end of rod 35 terminates in a ring 65 to which one end of a rope or lanyard 66 is attached. This same rope or lanyard 66 is routed through a pulley roller 67 attached to the side of guide 26 by way of a bracket 68. It is from this roller 67 that the rope 66 is directed upward by the support provided by a float 70.

As shown in FIGS. 1, 2 and 4, when the baited lever 51 is pulled downwardly in the direction A the lower end of rod 35 is unlatched allowing the rod to advance in the upward direction shown by the arrow U which concurrently brings the float 70 down according to the arrow D.

Obviously many modifications and variations to the above disclosure can be made without departing from the spirit of the invention. It is therefore intended that the scope of the invention be determined solely dependent on the claims hereto.

What is claimed is:

1. A trapping device for effecting capture of lobsters or other crustaceans, comprising:
    a substantially planar base member;
    a tubular mount extending orthogonally from one surface of said base member;
    a spring-loaded latch disposed on the interior of said mount including a bait supporting lever extending to the exterior thereof;
    a tubular guide received in attachment in the free end of said mount and extending axially therefrom, said guide further including two diametrically opposed longitudinal slots formed in the lateral surface thereof;
    a latching rod received for sliding articulation within said guide, said rod extending beyond said guide on either end thereof, said rod further including a latch engaging lip on the lower end thereof receivable within said mount for engaging said latch the engagement therebetween being released by a downward articulation of said bait supporting lever;
    a collar conformed to surround said guide and connected to said rod through said longitudinal slots for concurrent translation therewith;
    a first and second peripheral frame member each generally conformed to approximate one half of the periphery of said base, each said frame member forming a loop like structure pivotally engaged to said base at the free ends thereof, said frame members being connected to springs for pivotal urging thereof away from said base;
    a flexible mesh connected between said frame members and said base; and
    a first and second connecting element disposed respectively between said first and second frame member and said collar.

2. Apparatus according to claim 1 further comprising:
    a pulley roller mounted for rotation on the exterior of said guide;
    a length of rope tied at one end to the upper end of said latching rod and extending over said roller; and
    a float attached to said rope proximate the other end thereof.

3. Apparatus according to claim 2 wherein:
    said base member comprises a wire frame; and
    said bait supporting lever is disposed above said base at a height greater than the height of a crustacean.

* * * * *